C. C. Harris,
Wind Mill.

No. 95,018. Patented Sep. 21, 1869.

WITNESSES.

INVENTOR:
C. C. Harris.

United States Patent Office.

CHARLES C. HARRIS, OF LA FAYETTE, ILLINOIS.

Letters Patent No. 95,018, dated September 21, 1869.

IMPROVEMENT IN WIND-MILLS.

The Schedule referred to in these Letters Patent and making part of the same.

*To all whom it may concern:*

Be it known that I, CHARLES C. HARRIS, of La Fayette, in the county of Stark, and State of Illinois, have invented a new and improved Wind-Wheel; and I do hereby declare that the following is a full, clear, and exact description thereof, which will enable others skilled in the art to make and use the same, reference being had to the accompanying drawing, forming part of this specification.

The object of this invention is to provide a simple and cheap wind-wheel, with self-adjusting wings or buckets, capable of opening to the wind on one side and closing on the other.

The invention also comprises an improved arrangement for transmitting motion from the said wheel especially adapted for operating pumps.

Similar letters of reference indicate corresponding parts.

A and B represent the upper and lower sides of a horizontal wheel, supported on a vertical shaft, C, in a suitable frame.

D represents the buckets, pivoted to the said sides A B, the said pivots E being placed at about one-third the breadth of the buckets from one edge, and studs, F G, are provided in the rims, to limit the movement of these buckets on their journals.

These journals I propose to extend at the top up through the rim of the wheel, and bend them over in line with the longest diameter of the cross-section of the buckets or wings, and in the direction from the journals in which the said buckets are widest, as represented at H, and I bend them upward at the outer ends.

I represents bars, pivoted or hinged to the periphery of the lower rim B, and weighted at the upper ends, which extend a little above the upper rim, from the periphery of which guide-rods K project, through holes in the said rods, limiting the outward movement of the said ends, of which movement they are capable.

From the top of these rods I, project, radially, bars L, which support at their inner ends curved segmental bars.

Figure 1:
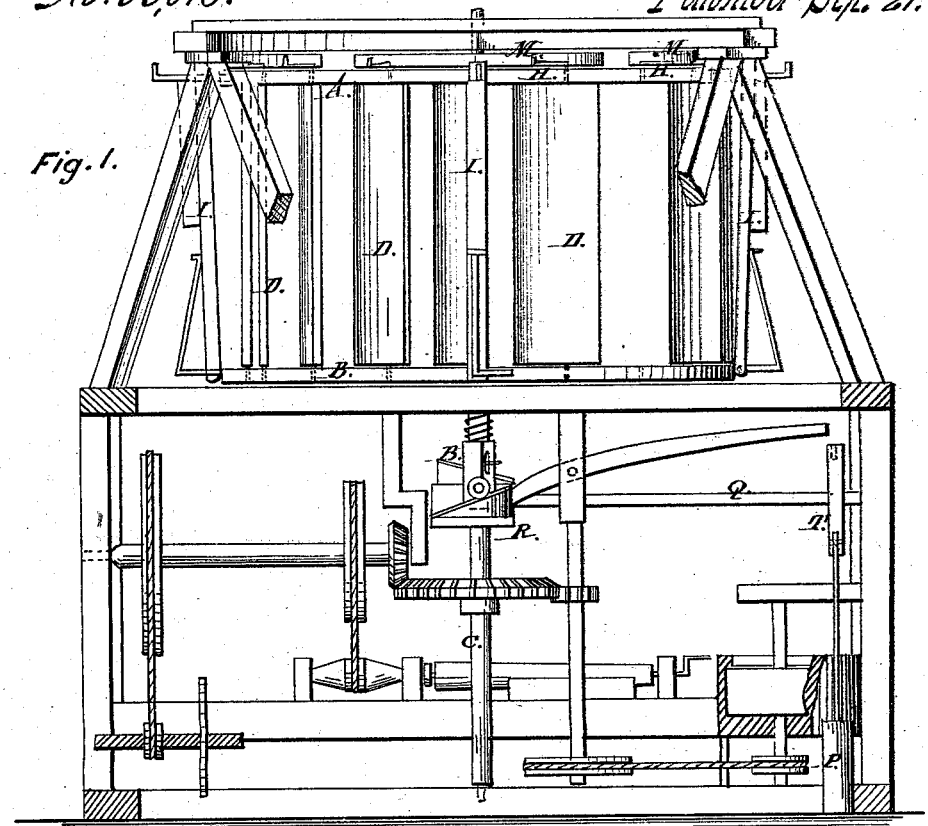
Figure 1 represents a sectional elevation of my improved wheel.
Figure 2:
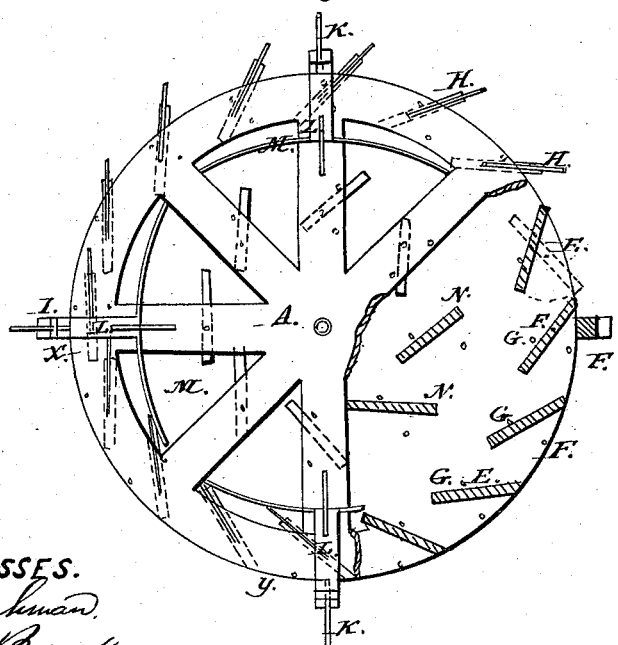
Figure 2 represents a top view, with the under side broken out.

When the wind blows upon the wheel, these buckets, on the side where the greatest breadth of the buckets are toward the wind, will open against the studs F, taking the wind sufficiently to set the wheel in motion, while those buckets on the other side will stand edgewise to the wind, as shown at the side *x*, fig. 2.

The weighted arms I are provided to prevent the wide part of the buckets being forced inward when coming around into the wind, as on the side *y*. Their action on the buckets is produced by being caused to swing outward by centrifugal force, which brings the segmental arms against bent rods, H, and swings the buckets outward to a circumferential position.

I propose to provide an interior set of similar buckets N, whereby a greater amount of surface is furnished for the wind to act upon.

For transmitting the motion for operating pumps P, or other reciprocating devices, I provide a horizontal shaft, Q, having arms or plates projecting each side of the vertical shafts, and on these I provide circular inclines, up which a roller, S, on an arm projecting from the shaft C, rides in swinging around in its regular course.

An oscillating motion will thus be imparted to the shaft Q, on which projecting arms T may be placed for working the connecting-rods of pumps or other reciprocating devices.

Having thus described my invention,

What I claim as new, and desire to secure by Letters Patent, is—

1. The buckets D, journalled in the sides A B, as described, and provided with the studs F G, for limiting their axial motion, substantially as specified.

2. The axial projections H of the buckets, shaped as described, and combined with the weighted and pivoted arms I, having the segmental arms M, all substantially as specified.

3. The combination of the shaft Q, the inclines R, shaft C, and roller S, all arranged substantially as specified.

CHARLES C. HARRIS.

Witnesses:
 PETHUEL PARISH,
 GEORGE D. CARTER.